Patented Dec. 15, 1931

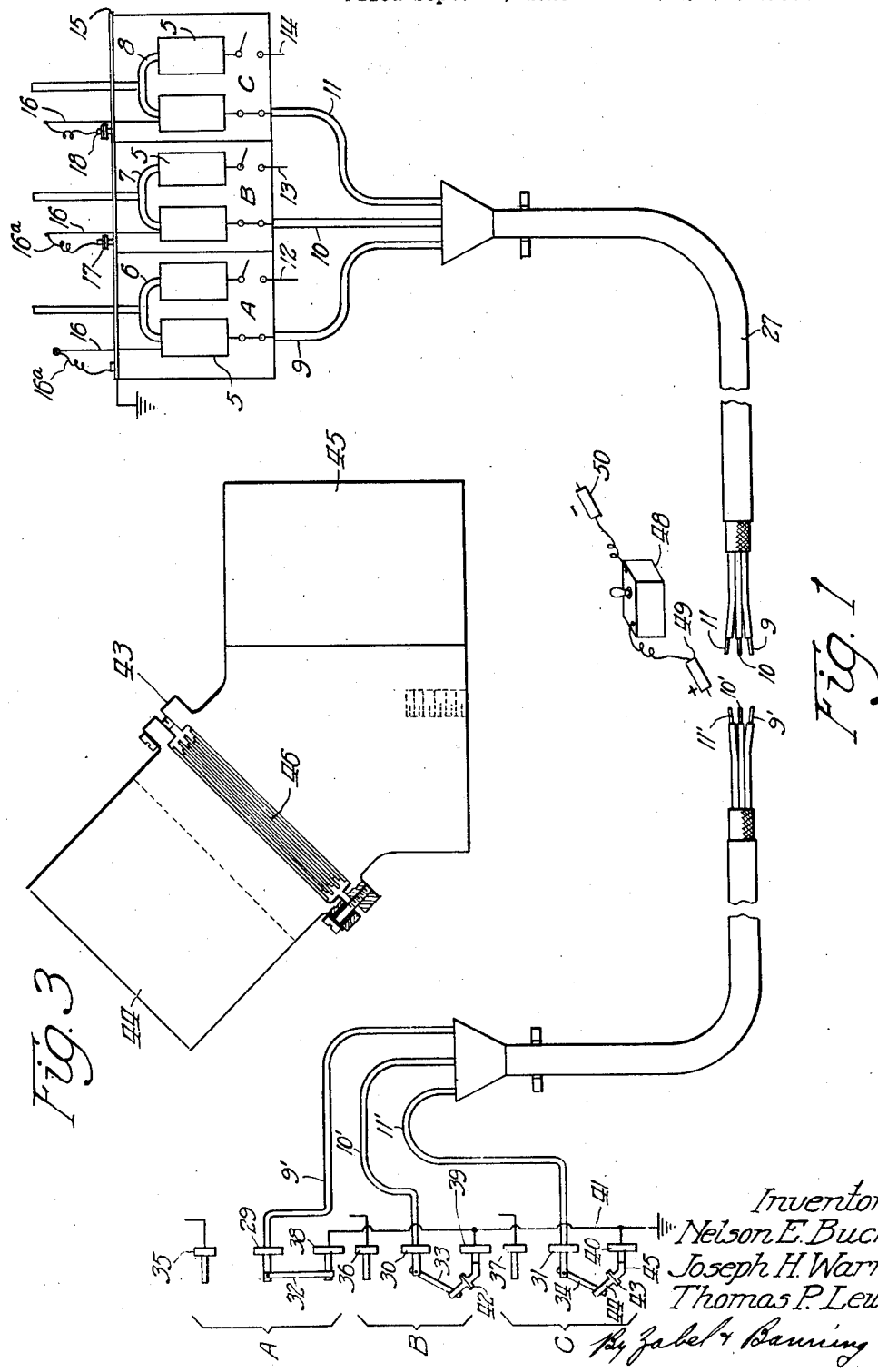

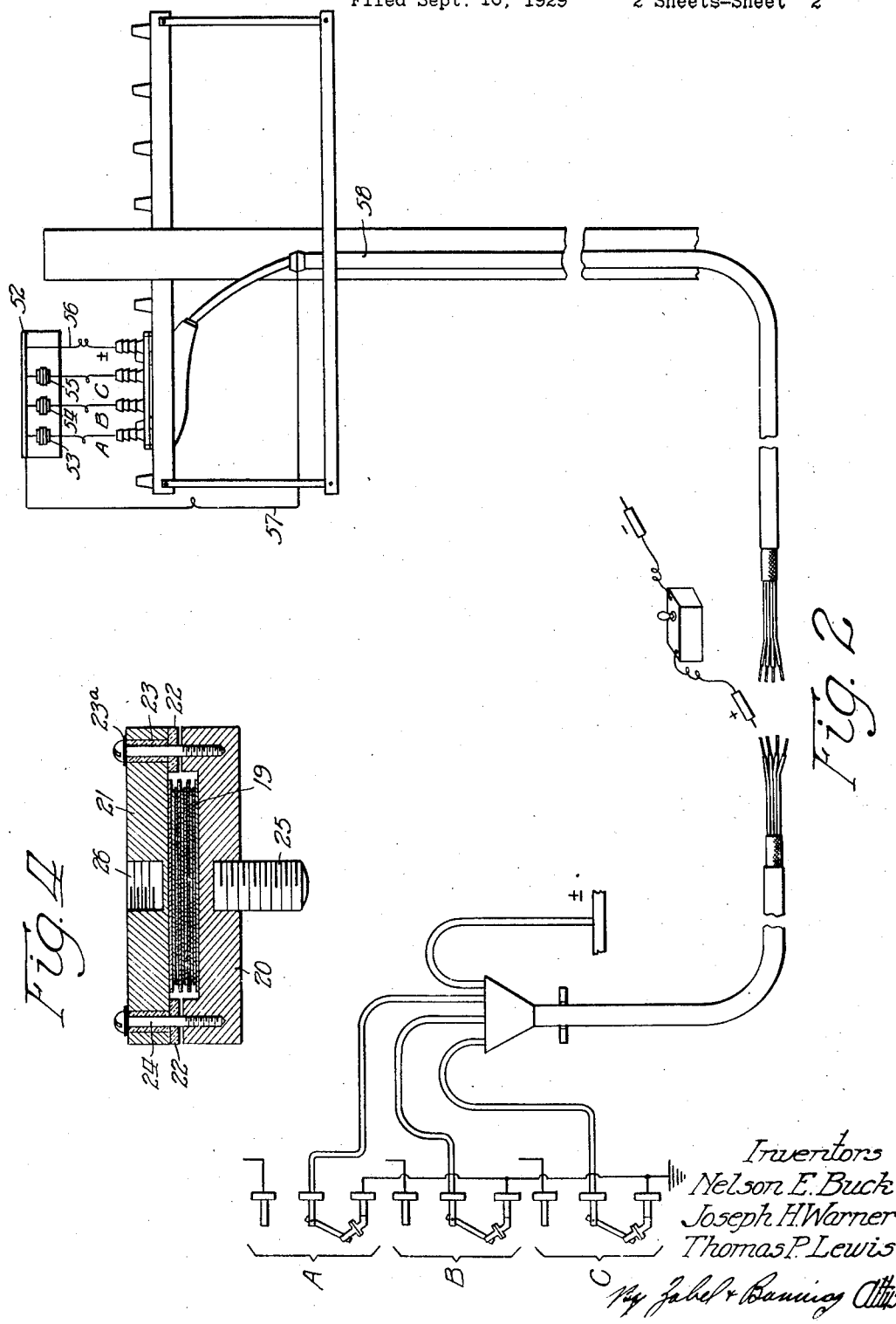

1,836,788

UNITED STATES PATENT OFFICE

NELSON E. BUCK, JOSEPH H. WARNER, AND THOMAS P. LEWIS, OF CHICAGO, ILLINOIS, ASSIGNORS TO ASSOCIATED ENGINEERS COMPANY, OF CHICAGO, ILLINOIS, A CORPORATION OF ILLINOIS

METHOD OF AND APPARATUS FOR IDENTIFYING PHASES OF ELECTRIC CIRCUITS

Application filed September 16, 1929. Serial No. 392,927.

Our invention relates to a method and means for properly identifying the phases of electric circuits, particularly in underground cables.

It is a prime purpose of this invention to provide a method and system whereby high potential cables (such as those carrying 4000 volts more or less) may be spliced, cut, or otherwise worked on and properly tested even though connected apparatus may be entirely inert or grounded, the arrangements for thus rendering such connected apparatus or conductors inert being for the purpose of preventing accidental application of high voltage to those parts of the cable being worked on.

Another important purpose of the invention is to provide an improved system of this character whereby the possibility of errors in connecting the leads in the cable incorrectly with respect to phase is practically eliminated.

A further and more particular advantage of this invention is to provide a system of this character which will reduce the operations necessary to properly test and connect the leads in the right phase relation, and thus reduce the time required to perform the work.

Other objects and advantages of the invention will appear as the description proceeds in connection with the accompanying drawings wherein are described specifically certain manners and forms for practicing our invention. Such specific description is not to be understood as limiting the broad features of our invention.

Fig. 1 is a diagrammatic view showing the system applied to underground connections;

Fig. 2 is a similar diagrammatic view showing the system applied to an underground cable connection between the central station and an overhead system;

Fig. 3 is an enlarged detail of one of the units used; and

Fig. 4 is a similar detail of another unit that may be used in the system.

When a cable is cut for instance due to trouble on the line of rearrangement work, it is necessary that the phase relationship of the conductors be properly identified before reconnecting the joint. The general method of identifying this phase relationship so far as we are aware, involves a number of operations by the station electricians, substation operators, trouble men, and foremen under hazardous conditions and with considerable loss of time. During these operations, the switches at cable termini must be open so as to leave the section cable free of high tension current; the various cable conductors must be grounded and certain of the grounds removed and potential applied thereto for identification, and finally the ends must be connected together and tested and put in service.

This procedure involves an average of sixteen telephone calls between the foreman in charge of the cable connection, load dispatcher, station electricians, substation operators, and the trouble man. Our improved method and apparatus eliminates much of this procedure.

There is shown in Fig. 1 a series of connecting switches indicated at 5, which switches are labeled A, B, and C wherein the connections are made by the forks 6, 7, and 8 between the cable leads 9, 10, and 11 and the leads 12, 13, and 14 extending to the bus lines. Means for temporarily grounding the cable leads 9, 10, and 11 consist of a grounded contact bar 15 which is connected by temporarily installed rods 16 and flexible conductors 16a to the cable sides of the switches 5. As shown, phase A is directly connected by this means, but with phases B and C the temporary ground rods 16 are connected to the ground of bar 15 through a pair of rectifying elements 17 and 18, respectively. The detailed construction of these rectifying elements is shown in Fig. 4. These rectifiers are preferably built up of a plurality of plates such as indicated at 19 which are coated on one side with copper oxide or the like to form the well-known copper oxide or similar rectifier.

A suitable number of these plates are superposed one upon the other to provide the necessary voltage drop for rectification. Since we obtain the voltage used in the test circuit from a suitable battery, these elements are connected in series so as to have a break-down strength of approximately fifty volts; above this voltage they act as an ordinary copper conductor. The supporting portions 20 and 21 for these rectifier elements are, of course, of conducting material insulated from each other as by means of the insulating washer 22 and sleeves 23 and are held together by suitable screws 24, through the interposition of insulating washers 23a.

The screwthreaded projection 25 serves as a means for connecting the unit to the grounded bar 15, and a screw-threaded socket 26 is provided in member 21 to receive a corresponding screw-threaded plug which forms the terminal of the flexible lead 16a. Under the old method of grounding, this terminal lead 16a was screwed directly into the grounded bar 15.

The leads 9, 10, and 11 form the conductors of the lead sheathed cable 27 which as shown in Fig. 1 has been cut, possibly in a manhole where the cable is being repaired, thus to expose these conductors as shown. The other ends of the leads indicated respectively by the numbers 9', 10', and 11', continue on through the lead sheathed cable to a series of switch terminals 29, 30, and 31. The terminals 29, 30, and 31 have pivoted knife blade conductors such as 32, 33, and 34 connected thereto, which blades are adapted normally to contact with the terminals 35, 36, and 37 which lead to suitable power busses at the station.

Associated with each of the units described which represent the connecting means for phases A, B, and C, there are a plurality of grounded terminals 38, 39, and 40 which are connected to a suitable ground conductor 41. During the testing of the phases, the blades 32, 33, 34 are connected with these grounded terminals, the blade 32 being directly connected, while blades 33 and 34 are connected through rectifying units 42 and 43 to their respective grounded terminals.

Rectifier units 42 and 43 are constructed in the manner illustrated in Fig. 3, that is to say, they each have a blade 45 adapted to enter jaws provided upon terminals 39 and 40, and their opposite ends 44 are provided with jaws to receive the blade conductors 33 and 34. The rectifying elements are the same as those described in connection with Fig. 4, namely, a series of copper oxide rectifier plates indicated generally at 46. There is this distinction, however, between the rectifiers 42 and 43 and that is that they are reversed with respect to each other. In other words, the rectifier 42 is so connected that positive current in phase B can only flow from the conductor to the ground wire. On phase C the rectifier 43 is so arranged as to permit positive current to flow from the ground to the cable conductor. This is also true of the rectifiers 17 and 18 associated with phases B and C at the outgoing end of the cable.

The operation in testing out the phases for connecting the leads will now be described. Assuming that the test apparatus indicated at 48 which consists of a battery with a lamp in series and which has the testing plugs 49 and 50 is used, the testing is done by connecting one of the leads 49 to a conductor of the cable, such as 9, 10, or 11 while the other lead 50 is grounded on the lead sheath. On A phase, since the terminal 38 is grounded and the ground rod 16 is connected to the corresponding switch 5, the tester will get a fully lighted lamp with either lead 49 or 50 connected to either 9 or 9' at the cut. Then on B phase he will get a light from the lamp only when the positive terminal 49 is connected to the corresponding cable lead 10 with the negative terminal 50 on the lead sheath because the rectifying properties of rectifiers 17 and 42 will prevent current from passing through the circuit in the opposite direction; and on C phase, the lamp will be lighted only when the negative lead 50 is connected to the corresponding conductor 11' or 11 and the other lead connected to the lead sheath, because the rectifiers 18 and 43 prevent passage of current through the circuit in the opposite direction.

In this way, the phase relationship of the leads may be identified and after the conductors have been connected together, they may again be checked by placing the leads 49 and 50 in contact therewith. If the proper cable splicing connections have been made, then when B phase is connected to the positive terminal 49 with the negative 50 on the lead sheath, the lamp will be lighted. If the connections happen to be wrong, however, and say lead 9' were connected to lead 11, then a full lamp lighting would be obtained regardless of whether 49 or 50 were placed in connection with the lead sheath. This gives an example of the manner in which errors in making connections may be checked even after the connections are made.

The system shown in Fig. 2 is substantially identical with that shown in Fig. 1 with the exception that a so-called phasing box 52 having the rectifying elements 53, 54, and 55 for phases A, B, and C is used. The fourth cable conductor is directly connected to the ground by the flexible ground lead 56. The phasing box ground bus is connected by a flexible wire 57 with the aid of a ground clamp to the lead sheath 58 of the cable. In this figure phases A, B, and C are each provided with rectifying elements, phases B and C being connected as before, one reversed with respect to the other and with the rectifiers at the opposite ends of the cable connected in like manner for each phase. On A phase the rectifier elements are opposed to each other in each rectifier so that no light will show with either connection of the leads of the tester. That is to say the rectifier elements inserted in phase A will not pass sufficient current in either direction to light the test lamp.

The rectifying elements may be seriously injured in case of a too great a current flow therethrough in the reverse direction. The testing battery current of course will not injure the elements since it flows through the high resistance lamp. There is in many instances, however, considerable sheath current which leaks off through these elements when the cable is cut. The sheath potential may be so high as to cause a large enough flow of current to injure the elements. Where this condition is encountered, a suitable resistance in series with the elements should be employed. This resistance may be of any suitable type, such for instance as a thin carbon plate superposed on the elements or simply a rectifier plate reversed with respect to the others.

These devices have been tested in connection with short circuit tests on switches and on currents up to two thousand amperes, and have shown no perceptible rise in potential across the rectifying element, thus demonstrating that they are capable of holding the conductor voltage down to a safe value in the event that the line should be accidentally made alive due to an operative error. In the use of this method there is no danger of the potential on the conductors rising to a dangerous value while the men are working thereon.

It will be seen that this system requires only two operations by men at the termini of the cable in aid of the cable repairmen. It is only necessary for them to disconnect from the live posts and connect to the ground posts at the termini of the cable at the beginning of the repair operation, and then when the repair operation is completed to again remove the ground connections and connect up the cable to the live posts.

In the claims we mean the term multi-phase to include circuits having two or more phases, and we mean the word termini to include any points upon opposite sides of that portion of the cable that is being worked on, to which it may be found most desirable to attach or apply our improved means.

From the above description it is thought that the construction and advantages of this device will be clear to those skilled in this art; and, having thus described our invention, what we desire to claim as new and secure by United States Letters Patent is:

1. A method of phase testing for power cables and the like which consists in grounding one phase through a unidirectional current conducting device having a breakdown voltage low enough to safeguard the operator, grounding another phase through a second unidirectional current conducting device arranged to pass current in the opposite direction to said first named device and having also a low breakdown voltage, grounding the third phase and applying a source of unidirectional current and indicator in series between the phase leads and ground, at the testing point whereby to identify the phases.

2. A method of identifying phases of leads in a multi-phase conductor system which consists in grounding said leads at their terminals through means permitting current at relatively low potential to pass therethrough in one direction in one phase and in the opposite direction in another phase and applying a source of unidirectional current associated with an indicator of current flow between the leads at said terminals and ground.

3. A method of identifying the phases of the leads in a multi-phase cable at a point remote from a station which consists in grounding said phases at the station through means permitting current at low potential to pass therethrough in one direction in one phase and in the opposite direction in another phase and in both directions in a third phase and applying a source of unidirectional current in series with an indicator of current flow between the leads at said remote point and ground.

4. A method of phase identification for intermediate points of underground cables which consists in grounding the phases at both ends of a cable in such manner as to permit current of low potential to flow only from ground to cable in one phase and only from cable to ground in another phase while permitting high potential charges to pass in either direction and applying a tester including low potential source of current to said intermediate points to identify the various phases.

5. In a phase testing system for multi-phase electrical conductors, ground connections for the terminals including unidirectional current conducting means having a low breakdown voltage.

6. In a phase testing system for multi-phase electrical conductors, ground connections for the terminals including unidirectional current conducting means having a low breakdown voltage and having a current capacity without appreciable rise in potential commensurate with the capacity of said conductor.

7. In a phase testing system for multi-phase electrical conductors, ground connections for the terminals including unidirectional current conducting means having a low breakdown voltage said means being oppositely connected in two of the phases.

8. In a phase testing system for multi-phase electrical conductors, ground connections for the terminals including unidirectional current conducting means having a low breakdown voltage, said means being made up of only contact rectifying elements.

9. In a phase testing system for multi-phase electrical conductors, ground connections for the terminals including unidirectional current conducting means having a low breakdown voltage said means consisting of copper oxide rectifiers.

10. In a phase testing system for humanly dangerous high voltage multi-phase circuits, means applied at termini of such circuit to prevent existence thereon of the said high voltage, testing means cooperating with said means for impressing humanly harmless potentials of unlike character selectively upon conductors of suit circuit.

11. The method of identifying the phase relationship of conductors in a high voltage multi-phase system, which consists in applying means at termini of such system to prevent existence of said high voltage between that portion of the system under work and ground, then impressing humanly harmless potentials of unlike character selectively upon conductors of said system, and applying an indicator to such conductors to thereby determine the said phase relationship.

12. In a testing system for humanly dangerous high voltage multi-conductor systems, ground connections for the terminals including unidirectional current conducting means having a low breakdown voltage.

In witness whereof, we hereunto subscribe our names this 27th day of August A. D., 1929.

NELSON E. BUCK.
JOSEPH H. WARNER.
THOMAS P. LEWIS.